United States Patent
Smith et al.

(10) Patent No.: US 6,941,149 B2
(45) Date of Patent: Sep. 6, 2005

(54) METHOD AND APPARATUS FOR PROVIDING INSTANT MESSAGING IN A WIRELESS COMMUNICATION SYSTEM

(75) Inventors: Dwight Randall Smith, Grapevine, TX (US); Cristina Menendez Riveron, Wellington, FL (US); Jeffrey David Couts, Fort Worth, TX (US)

(73) Assignee: Motorola, Inc., Schaumburg, IL (US)

(*) Notice: Subject to any disclaimer, the term of this patent is extended or adjusted under 35 U.S.C. 154(b) by 632 days.

(21) Appl. No.: 09/886,346

(22) Filed: Jun. 21, 2001

(65) Prior Publication Data

US 2002/0198008 A1 Dec. 26, 2002

(51) Int. Cl.[7] .................................. H04Q 7/20
(52) U.S. Cl. ...................... 455/466; 709/206
(58) Field of Search .................. 455/466, 435.1, 455/410, 411, 414.1–414.3, 426.1, 556.2, 412.1, 412.2, 413; 709/206, 207; 375/250, 244, 240.02; 717/168, 172, 173

(56) References Cited

U.S. PATENT DOCUMENTS 6,161,145 A * 12/2000 Bainbridge et al. ......... 709/203
6,239,793 B1 * 5/2001 Barnert et al. ............. 709/203
6,636,872 B1 * 10/2003 Heath et al. ............... 709/248
2002/0026520 A1   2/2002 Mendiola et al.
2002/0061003 A1   5/2002 Summer et al.
2002/0073158 A1   6/2002 Dalal et al.
2002/0129103 A1 * 9/2002 Birkler et al. ............. 709/203
2002/0184089 A1 * 12/2002 Tsou et al. ................. 709/206

* cited by examiner

*Primary Examiner*—Eliseo Ramos-Feliciano
(74) *Attorney, Agent, or Firm*—Hisashi D. Watanabe

(57) ABSTRACT

An apparatus (20) and methods are provided for providing Instant Messaging (IM) in a wireless communication system. The apparatus (20) comprises an IM data storage device (22) configured to store first IM contact data associated with an IM client and an IM server (24) configured to access the IM data storage device (22) and retrieve the first IM contact data associated with the IM client. The apparatus (20) is further comprised of an IM access portal (26) in operable communication with the IM server (24) and configured to access second IM contact data associated with the IM client and transmitted to a wireless device (29) of the IM client during a prior wireless connection. The IM access portal (26) is further configured to perform a comparison of the first IM contact data and the second IM contact data and transmit difference IM contact data (54) to the wireless device (29) of the IM client that is produced with the comparison of the first IM contact data and the second IM contact data.

21 Claims, 3 Drawing Sheets

METHOD AND APPARATUS FOR PROVIDING INSTANT MESSAGING IN A WIRELESS COMMUNICATION SYSTEM

FIELD OF THE INVENTION

The present invention generally relates to Instant Messaging, and more particularly to methods and apparatus for providing Instant Messaging (IM) in a wireless communication system.

BACKGROUND OF THE INVENTION

Wireless data services and the communication systems that support wireless data services represent a rapidly growing and increasingly important segment of the communications industry. The growth in wireless data services has been spurred by the rapid growth and development of the paging industry and increasing customer demand for advanced paging and short messaging services (SMS). In order to provide the wireless data services requested by customers, the communications industry has strived to effectively utilize existing wireless communication systems and future generations of these wireless communications systems by incorporating wireless data services into these existing wireless communications systems and future generations thereof (e.g., wireless voice communication systems such as mobile radio and cellular networks).

Instant Messaging (IM) has emerged as an efficient fixed-line data service that can be incorporated into wireless communications system and future generations thereof and has also been expanded to operate with numerous wireless devices. IM provides the ability of wireless subscribers that use wireless devices to send short messages without the delay generally associated with electronic mail (i.e., e-mail) messages. However, a significant amount of duplicate information is currently transmitted to wireless devices during IM communication sessions and the wireless communications systems generally have a limited bandwidth and unnecessary utilization of bandwidth is undesirable. Therefore, the information transmitted and received by a wireless device during an IM communication session is preferably minimized to reduce and effectively utilize the bandwidth of a wireless communication system in an IM communication session.

In view of the foregoing, it can be appreciated that it would be desirable to provide methods for providing IM in a wireless communication system (e.g., wireless voice communication system and/or wireless data communication system). In addition, it can be appreciated that it would be desirable to provide an apparatus for providing IM with a wireless device in a wireless communication system. Furthermore, additional desirable features will become apparent to one of ordinary skill in the art from the following detailed description of a preferred exemplary embodiment and appended claims.

BRIEF DESCRIPTION OF THE DRAWINGS

The present invention will hereinafter be described in conjunction with the appended drawing figures, wherein like numerals denote like elements, and.

DETAILED DESCRIPTION OF THE DRAWINGS

Figure 1:
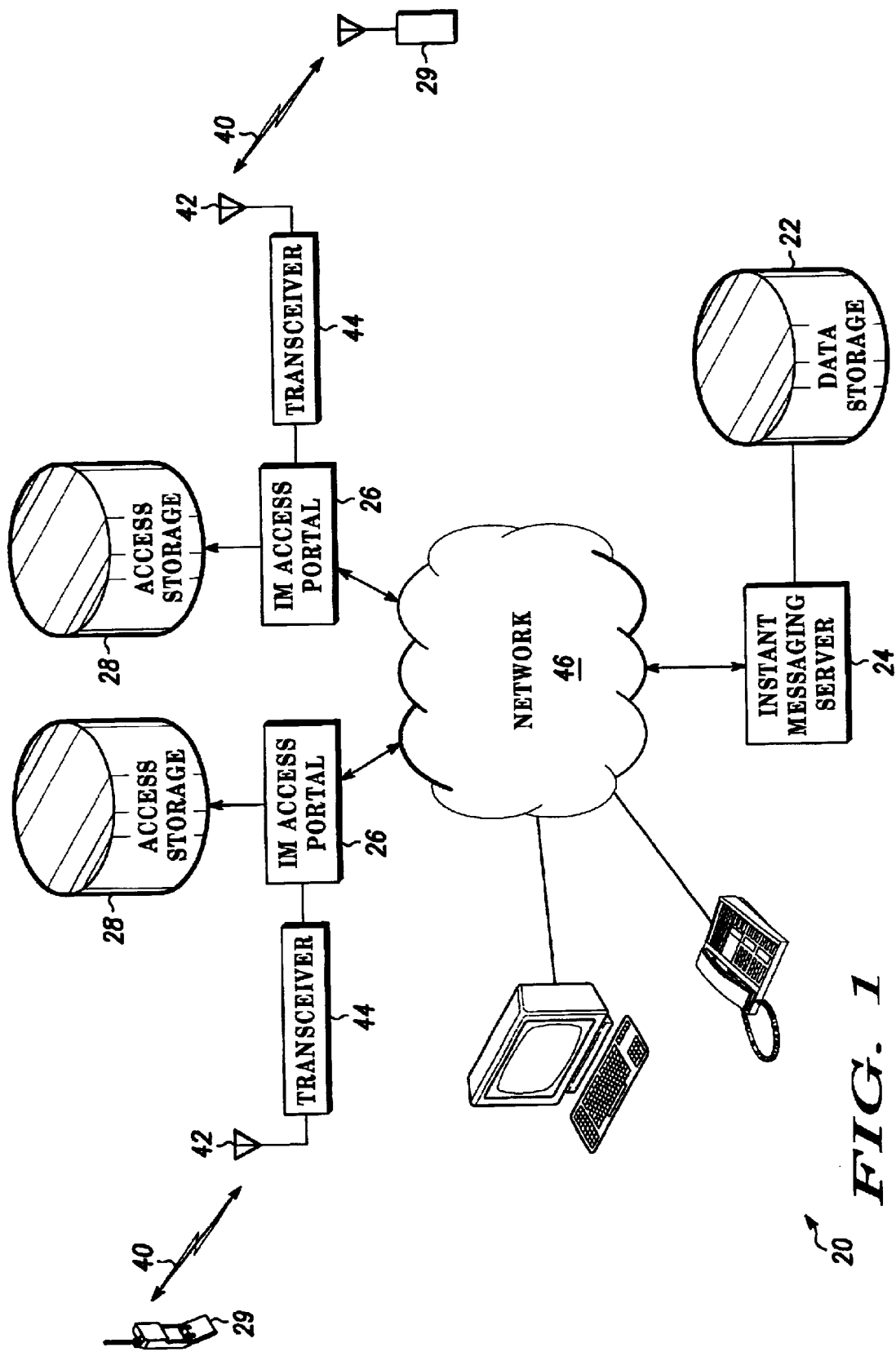
FIG. 1 is an apparatus for providing Instant Messaging (IM) in a wireless communication system according to an embodiment of the present invention.

Referring to FIG. 1, an apparatus 20 for providing Instant Messaging (IM) in a wireless communication system is illustrated according to an embodiment of the present invention. The apparatus 20 for providing IM in a wireless communication system is comprised of an IM data storage device 22 that is configured to at least store IM contact data associated with an IM client. The apparatus 20 for providing IM in a wireless communication system is also comprised of an IM server 24 configured to access the IM data storage device 22 and retrieve the IM contact data associated with the IM client. The apparatus 20 for providing IM in a wireless communication system is further comprised of an IM access portal 26 in operable communication with the IM server 24 and configured to access an IM access portal storage device 28 that is configured to store IM contact data associated with the IM client and transmitted to a wireless device 29 used by the IM client during a prior wireless connection with the IM access portal 26. The IM access portal 26 is further configured to perform a comparison of IM contact data and transmit difference IM contact data to the wireless device 29 that is produced with the comparison of the IM contact data retrieved from the IM data storage device 22 and the IM contact data stored in the IM access portal storage device 28. While the wireless device 29 illustrated in FIG. 1 is a cellular telephone, any number of wireless communication devices can be used according to the present invention. For example, a mobile radio, two-way pager and wireless Personal Data Assistant (PDA) can be used according to the present invention.

The wireless communication system is a connection-oriented protocol or service between multiple IM clients (i.e., multiple clients or users of the IM services) of the IM server 24. Therefore, IM client interaction is conducted prior to the transport of data between IM clients. The interaction between the IM clients is governed by a transport control protocol (TCP) and the TCP identifies the terminals to each other and defines the rules associated with the exchange of data.

The exchange of data in an IM service provided by the apparatus 20 of the present invention provides a throughput (i.e., rate of information transfer between IM clients) that is generally greater than the throughput provided by an asynchronous electronic mail (e-mail) service. In addition, the IM service provided by the apparatus 20 of the present invention provides an average delay and maximum delay metrics that are less than the average delay and maximum delay metrics provided by an asynchronous e-mail service. However, the IM service provided by the apparatus 20 of the present invention operates on a reduced order of immediacy than telephone service over the Public Switched Telephone Network (PSTN) (i.e., the throughput of an IM service is generally less than telephone service and the average delay and maximum delay of an IM service is generally greater than telephone service.)

The IM service is also unique in that specific forms of messages are exchanged between IM clients, which are generally short and text based messages even though any number of message formats can be used according to the present invention. In addition, the IM service is different in the processing and initiation of the messages. For example, in contrast to a user identification (ID) for e-mail, a user ID for IM refers to more than a static destination or message repository. Rather, IM contact data is intimately tied to presence of an IM client, availability of an IM client, and/or willingness to send and/or receive messages from other IM clients.

Figure 2:
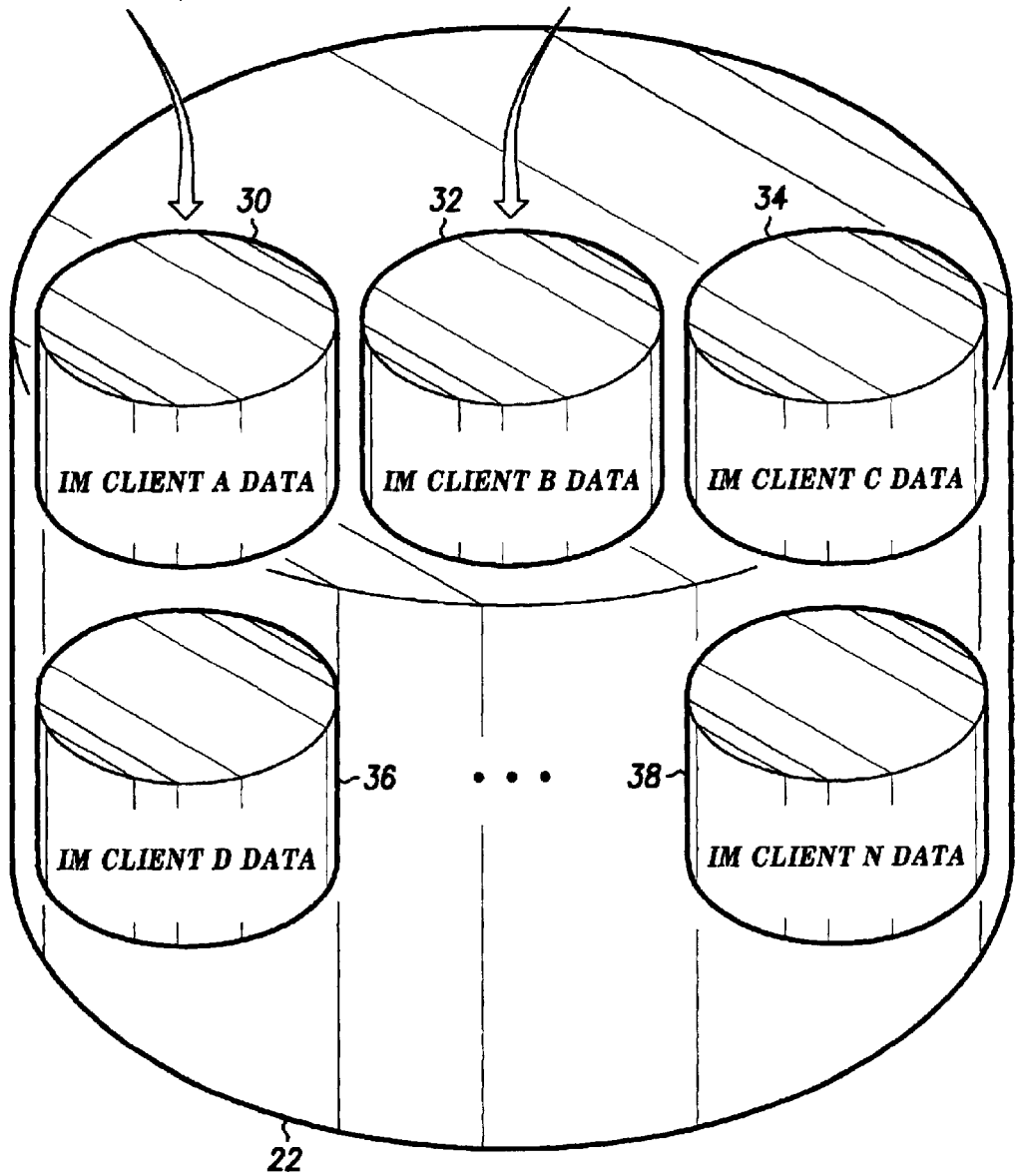
FIG. 2 is the IM storage device of FIG. 1 in greater detail according to an embodiment of the present invention.

Referring to FIG. 2, the IM data storage device 22 of FIG. 1 is illustrated in greater detail with multiple IM contact data associated with multiple IM clients. The IM storage device 22 can be configured to store any number of IM contact data associated with any number of clients. For example, the IM storage device 22 can be configured to store the IM contact data associated with a first IM client 30 (e.g., IM client A addressing data), IM contact data associated a second IM client 32 (e.g., IM client B addressing data), IM contact data associated with a third IM client 34 (e.g., IM client C addressing data), IM contact data associated with a fourth IM client 36 (e.g., IM client D addressing data) and IM contact data associated with an Nth IM client 38 (e.g., IM client N addressing data), where N is the number of clients receiving IM services or a subset of IM clients receiving IM services. The IM contact data associated with the IM clients (30,32,34,36,38) is comprised of a list of other IM clients (i.e., users of the IM service) that an IM client has selected for communication and the corresponding availability of the IM client (e.g., in a meeting, urgent messages only). However, the IM contact data associated with the IM clients (30,32,34,36,38) can include additional information such as an on-line classification (e.g., work-mode, social-mode, etc.) and the data structure of the IM contact data can also have a hierarchical representation of the other IM clients that an IM client has selected for communication (e.g., work-contacts, social-contacts, family-contacts, etc.). The IM contact data associated with the IM clients (30,32,34,36,38) is transmitted to other IM clients subscribing to the IM service that an IM client has authorized to receive the information.

Referring to FIG. 1, in order to initiate an IM communication session from a wireless device 29 or reconnect the wireless device 29 to the IM service, the IM client activates the wireless device 29 and the IM service function of the wireless device 29, which executes the client software existing on the wireless device 29 to access the IM service. The client software initiates the appropriate actions on the wireless device 29 to transmit a wireless communication signal 40 requesting activation of IM for the wireless device 29 and also communication of any updates to the IM contact data associated with the IM client using the wireless device 29. The wireless communication signal 40 can be any number of electromagnetic radiation signals within any number of selected frequency bands.

An antenna 42 of a transceiver 44 (i.e., communication signal transmitter and receiver) receives the wireless communication signal 40 that can be any number of electromagnetic interception devices, including, but not limited to a wave guide, a coaxial cable, an optical fiber or an infrared frequency transducer that is configured to receive the wireless communication signal 40. The electromagnetic radiation of the wireless communication signal 40 is converted to an appropriate signal that is presented to the IM access portal 26 such that a wireless communication link is established between the wireless device 29 and the IM access portal 26.

Once the wireless communication link is established between the wireless device 29 and the IM access portal 26, the IM access portal 26 is configured to request that the IM server 24 retrieve the current IM contact data associated with the IM client that is stored in the IM data storage device. The IM access portal 26 is in operable communication with the IM server 24 through a data network 46 that can be a wireless network, wire network (i.e., fixed-wire) or combination of a wireless and wire network. For example, the data network 46 can be the Internet, an Intranet, a cellular or mobile radio network, a Local Area Network (LAN), the Public Switched Telephone Network (PSTN), any combination thereof, or the like.

The IM server 24 is configured to access the IM data storage device 22 and retrieve the current IM contact data associated with the IM client that is stored in the IM data storage device 22. In addition, the IM server 24 is configured to access the IM data storage device 22 and update the IM contact data of the other IM clients with the availability or other addressing data updates provided by the IM client initiating the IM communication session. Furthermore, the IM server 24 is configured to transmit the current IM contact data associated with the IM client to the IM access portal 26 for further processing.

Figure 3:
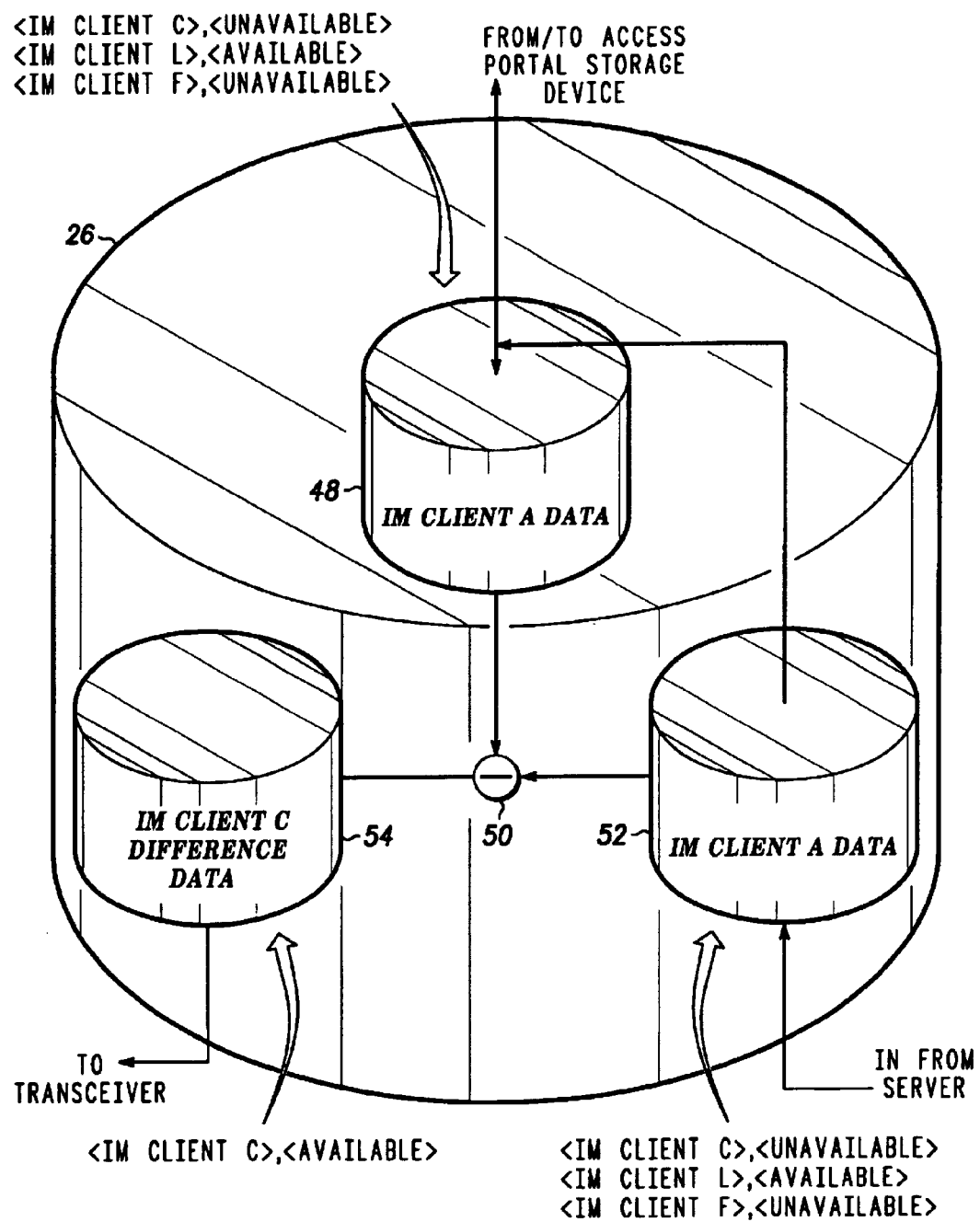
FIG. 3 is the IM access portal of FIG. 1 in greater detail according to an embodiment of the present invention.

More specifically and with reference to FIG. 3, which illustrates the IM access portal 26 of FIG. 1 in greater detail, the IM access portal 26 is configured to access previous IM contact data 48 associated with the IM client that was transmitted to the wireless device 28 during a prior connection of the IM client and stored in the IM access storage device. The previous IM contact data 48 that was transmitted to the wireless device 29 during a prior IM communication session is presented to a comparator 50 that is also configured to receive the current IM contact data 52 associated with the IM client that is stored in the IM data storage device and transmitted to the IM access portal from the IM server. The comparator 46 of the IM access portal 26 is configured to perform a comparison of the previous IM contact data 48 and the current IM contact data 52 associated with the IM client. This comparison by the comparator 46 of the IM access portal 26 produces difference IM contact data 54 that is transmitted to the wireless device.

The comparison by the comparator 46 is configured to produce the difference IM contact data 54 that identifies IM contact data that has been updated in the IM data storage device, but has not been transmitted to the wireless device. The difference IM contact data 54 is transmitted to the wireless device and the previous IM contact data 48 associated with the IM client is updated with the current IM contact data 52 associated with the IM client for subsequent comparisons by the comparator 50 of the IM access portal 26. As can be appreciated by one of ordinary skill in the art, the difference IM contact data 54 generally has less data than the current IM contact data 52 and previous IM contact data 48. Therefore, the difference IM contact data 54 generally provides the current IM contact data 52 associated with the IM client and stored in the IM storage device of the IM server to the wireless device without duplicating information that was previously transmitted to the wireless device by the IM access portal 26. In this way, the current IM contact data 52 associated with an IM client can be provided to the wireless device using less bandwidth of the communication signal than would be necessary if all or the majority of the current IM contact data 52 associated with the IM client was transmitted to the wireless device.

Referring to FIG. 1, in addition to performing the actions previously described in this detailed description of the drawings when the wireless device initially establishes a wireless connection with the IM access portal 26, the apparatus 20 for providing IM services in a wireless communication system and the corresponding method for providing IM services in a wireless communication system can be configured to perform retrieval and comparison at any number of predefined events. For example, the IM access portal 26 can be configured to request retrieval of the current IM contact data from the IM server 24 and perform the comparison of the current IM contact data and the previous IM contact data at a predetermined interval after the wireless device initially establishes the wireless connection with the IM access portal 26 or if the current IM contact data is altered during a IM communication session of the wireless device.

Numerous embodiments and variations of the foregoing illustrative embodiment are available in accordance with the present invention. For example, the apparatus 20 can be configured to store multiple versions of IM contact data used by an IM client and retrieve a specific version of IM contact data from the IM data storage device 22 at the request of the IM client from the wireless device 29. According to another embodiment of the present invention, the apparatus 20 can be configured to support multiple wireless devices used by a single IM client and update the IM contact data of each of these multiple wireless devices with the current IM contact data of the IM client upon activation and/or connection. The apparatus 20 can be configured to support the simultaneous use and update of more than one wireless device of the IM client or limit use to a single wireless. In addition, the apparatus 20 can be configured to receive changes of the IM contact data of an IM client from the wireless device 29 and update the IM contact data stored in the IM data storage device 22, IM access portal storage device 28, wireless devices of other IM clients that are active and wireless devices of other IM clients that are available and/or subsequently available using the techniques previously described in this detailed description of the drawings.

As may be appreciated from the foregoing detailed description of the drawings, apparatus and methods are presented that provide IM in a wireless communication system. The apparatus and methods of the present invention reduce the amount of duplicate information transmitted to wireless devices during IM communication sessions and thereby reduces the bandwidth used by the wireless device during an IM communication session. In addition, many desirable features of the present invention will become apparent to one skilled in the art from the foregoing detailed description.

The foregoing detailed description of the drawings has only been presented for the purpose of illustration and description. Therefore, this detailed description of the drawings is not intended to be exhaustive or to limit the invention to the precise form disclosed herein. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular contemplated use. All such modifications and variations are within the scope of the invention as determined by the appended claims.

What is claimed is:

1. An apparatus for providing Instant Messaging (IM) services in a wireless communication system, comprising:
    an IM data storage device configured to store first IM contact data associated with an IM client;
    an IM server configured to access said IM data storage device and retrieve said first IM contact data associated with said IM client; and
    an IM access portal in operable communication with said IM server and configured to access second IM contact data associated with said IM client and transmitted to a wireless device of said IM client during a prior wireless connection, said IM access portal further configured to perform a comparison of said first IM contact data and said second IM contact data and transmit difference IM contact data to the wireless device of said IM client that is produced with said comparison of said first IM contact data and said second IM contact data,
    wherein said second IM contact data associated with said IM client is undated with said first IM contact data associated with said IM client for subsequent comparison.

2. The apparatus for providing IM services in the wireless communication system of claim 1, wherein said IM access portal is configured to perform said comparison of said first IM contact data and said second IM contact data when the wireless device initially establishes a wireless connection with said IM access portal.

3. The apparatus for providing IM services in the wireless communication system of claim 1, wherein said IM access portal is configured to perform said comparison of said first IM contact data and said second IM contact data at a predetermined interval after the wireless device initially establishes the wireless connection with said IM access portal.

4. The apparatus for providing IM services in the wireless communication system of claim 1, wherein said IM access portal is configured to perform said comparison of said first IM contact data and said second IM contact data if said first IM contact data is altered during an IM communication session.

5. The apparatus for providing IM services in the wireless communication system of claim 1, wherein said difference IM contact data has about less addressing data than said first IM contact data.

6. The apparatus for providing IM services in the wireless communication system of claim 1, wherein said difference IM contact data has about less addressing data than said second IM contact data.

7. The apparatus for providing IM services in the wireless communication system of claim 1, further comprising an IM access portal storage device configured to store said second IM contact data.

8. The apparatus for providing IM services in the wireless communication system of claim 1, wherein said wireless device is a cellular telephone.

9. The apparatus for providing IM services in the wireless communication system of claim 1, wherein said wireless device is a two-way pager.

10. The apparatus for providing IM services in the wireless communication system of claim 1, wherein said wireless device is a mobile Personal Data Assistant (PDA).

11. The apparatus for providing IM services in the wireless communication system of claim 1, wherein said wireless device is a mobile radio.

12. A method for providing Instant Messaging (IM) services in a wireless communication system, comprising:
    establishing a wireless communication link between a wireless device and an IM access portal;
    retrieving first IM contact data associated with an IM client from an IM data storage device of an IM server;
    comparing said first IM contact data retrieved from said IM server and second IM contact data associated with said IM client and transmitted to said wireless device of said IM client during a prior wireless connection;
    generating difference IM contact data with said comparing said first IM contact data associated with said IM client retrieved from said IM server and said second IM contact data associated with said IM client and transmitted to said wireless device of said IM client during said prior wireless connection;

transmitting said difference IM contact data to the wireless device; and updating said second IM contact data associated with said IM client with said first IM contact data associated with said IM client for subsequent comparison.

13. The method for providing IM services in the wireless communication system of claim 12, wherein said comparing said first IM contact data and said second IM contact data is conducted when the wireless device initially establishes a wireless connection with said IM access portal.

14. The method for providing IM services in the wireless communication system of claim 12, wherein said comparing said first IM contact data and said second IM contact data is conducted at a predetermined interval alter the wireless device initially establishes the wireless connection with said IM access portal.

15. The method for providing IM services in the wireless communication system of claim 12, wherein said comparing said first IM contact data and said second IM contact data is conducted if said first IM contact data is altered during a IM communication session.

16. The method for providing IM services in the wireless communication system of claim 12, wherein said difference IM contact data has about less data than said first IM contact data.

17. The method for providing IM services in the wireless communication system of claim 12, wherein said difference IM contact data has about less addressing data than said second IM contact data.

18. The method for providing IM services in the wireless communication system of claim 12, wherein said wireless device is a cellular telephone.

19. The method for providing IM services in the wireless communication system of clam 12, wherein said wireless device is a two-way pager.

20. The method for providing IM services in the wireless communication system of claim 12, wherein said wireless device is a mobile Personal Data Assistant (PDA).

21. The method for providing IM services in the wireless communication system of claim 12, wherein said wireless device is a mobile radio.

* * * * *

UNITED STATES PATENT AND TRADEMARK OFFICE
CERTIFICATE OF CORRECTION

PATENT NO. : 6,941,149 B2
DATED : September 6, 2005
INVENTOR(S) : Smith et al.

It is certified that error appears in the above-identified patent and that said Letters Patent is hereby corrected as shown below:

Column 6,
Line 9, delete "undated" and replace with -- updated --.

Signed and Sealed this

First Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,941,149 B2
APPLICATION NO. : 09/886346
DATED : September 6, 2005
INVENTOR(S) : Smith et al.

It is certified that error appears in the above-identified patent and that said Letters Patent is hereby corrected as shown below:

Column 7,
Line 18, delete "alter" and replace with -- after --.

Signed and Sealed this

Twenty-seventh Day of June, 2006

JON W. DUDAS
*Director of the United States Patent and Trademark Office*